(12) United States Patent
Spariosu et al.

(10) Patent No.: US 7,742,512 B2
(45) Date of Patent: Jun. 22, 2010

(54) SCALABLE LASER WITH ROBUST PHASE LOCKING

(75) Inventors: Kalin Spariosu, Thousand Oaks, CA (US); Alexander A. Betin, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 831 days.

(21) Appl. No.: 10/771,047

(22) Filed: Feb. 2, 2004

(65) Prior Publication Data

US 2005/0169323 A1  Aug. 4, 2005

(51) Int. Cl.
*H01S 3/13*   (2006.01)
*H01S 3/10*   (2006.01)
*H01S 3/091*  (2006.01)
*H01S 3/08*   (2006.01)

(52) U.S. Cl. .................. 372/29.023; 372/9; 372/72; 372/92; 372/97

(58) Field of Classification Search .............. 372/9, 372/29.023, 70, 92, 97, 6
See application file for complete search history.

(56) References Cited

U.S. PATENT DOCUMENTS

| | | | | |
|---|---|---|---|---|
| 4,479,224 A * | 10/1984 | Rediker | ............... | 372/92 |
| 4,786,132 A * | 11/1988 | Gordon | ............... | 385/38 |
| 5,027,359 A * | 6/1991 | Leger et al. | ............... | 372/18 |
| 5,202,893 A * | 4/1993 | Kubota et al. | ............... | 372/34 |
| 5,258,978 A * | 11/1993 | Cloonan et al. | ............... | 370/411 |
| 5,276,758 A * | 1/1994 | Hughes | ............... | 385/116 |
| 5,317,576 A * | 5/1994 | Leonberger et al. | ............... | 372/6 |
| 5,652,756 A * | 7/1997 | Stultz et al. | ............... | 372/10 |
| 5,677,920 A * | 10/1997 | Waarts et al. | ............... | 372/6 |
| 5,789,996 A | 8/1998 | Borodulin | | |
| 5,862,278 A * | 1/1999 | Brauch et al. | ............... | 385/34 |
| 5,872,627 A * | 2/1999 | Miers | ............... | 356/338 |
| 6,090,102 A * | 7/2000 | Telfair et al. | ............... | 606/10 |
| 6,298,187 B1 * | 10/2001 | Waarts et al. | ............... | 385/37 |
| 6,356,574 B1 * | 3/2002 | Craig et al. | ............... | 372/75 |
| 6,671,098 B2 * | 12/2003 | Feldman | ............... | 359/626 |
| 6,882,786 B1 * | 4/2005 | Kliner et al. | ............... | 385/115 |
| 6,982,997 B1 * | 1/2006 | Jiang et al. | ............... | 372/6 |
| 2002/0159489 A1 * | 10/2002 | Wolak et al. | ............... | 372/36 |
| 2003/0063631 A1 * | 4/2003 | Corcoran | ............... | 372/18 |
| 2003/0086154 A1 * | 5/2003 | Feillens et al. | ............... | 359/341.3 |

(Continued)

FOREIGN PATENT DOCUMENTS

EP    0723323 A2    7/1996

(Continued)

OTHER PUBLICATIONS

K. Spariosu and M. Bimbaum, "Intracavity 1.549—µm Pumped 1.634-µm Er:YAG Lasers at 300 K"; "IEEE Journal of Quantum Electronics", "Intracavity 1.549—µm Pumped 1.634-µm Er:YAG Lasers at 300 K", vol. 30, pp. 1044-1049, Apr. 1994.*

(Continued)

*Primary Examiner*—Minsun Harvey
*Assistant Examiner*—Phillip Nguyen (57) ABSTRACT

A robust scalable laser. The laser includes plural fiber laser resonators. A cavity that is external to the fiber laser resonators combines plural laser beams output from the plural fiber laser resonators into a single output laser beam. In a specific embodiment, the plural fiber laser resonators are eye-safe double-clad Er:YAG laser resonators that are pumped via laser diode arrays.

27 Claims, 5 Drawing Sheets

U.S. PATENT DOCUMENTS

| | | | |
|---|---|---|---|
| 2003/0160864 A1* | 8/2003 | Kremen | 348/51 |
| 2004/0042085 A1* | 3/2004 | Hough | 359/619 |
| 2004/0246570 A1* | 12/2004 | Feillens et al. | 359/341.1 |
| 2005/0018740 A1* | 1/2005 | Hamilton et al. | 372/92 |
| 2005/0078714 A1* | 4/2005 | Komine | 372/3 |
| 2005/0081908 A1* | 4/2005 | Stewart | 136/246 |
| 2006/0133731 A1* | 6/2006 | Sintov | 385/43 |
| 2007/0273957 A1* | 11/2007 | Zalevsky et al. | 359/326 |

FOREIGN PATENT DOCUMENTS

| | | |
|---|---|---|
| JP | 2001 028507 | 1/2001 |
| WO | WO 01/09992 | 9/2001 |

OTHER PUBLICATIONS

"1kW CW output from fiber-embedded disk lasers" Ueda, K.; Sekiguchi, H.; Kan, H.; Lasers and Electro-Optics, 2002. CLEO '02. Technical Digest. Summaries of Papers Presented at the 2002 pp. CPDC4-1-CPDC4-2 vol. 2 Digital Object Identifier 10.1109/CLEO. 2002.1034492.*

Corcoran C J et al: Operation of five individual diode lasers . . . Applied Physics Letters USA, vol. 59, No. 7, Aug. 12, 1991, pp. 759-761 XP002397087.

Vysotskii D V et al: Multicore Fibre Laser Phase Locking by an External Mirror: Quantum Electronics, Turpion Ltd., London, GB vol. 31, No. 4 Apr. 2001, pp. 298-302.

Morse T F: "optically Pumped High-Power Fiber Lasers" Proceedings of the SPIE—vol. 4648, 2002, pp. 91-103, XP002397088.

* cited by examiner

SCALABLE LASER WITH ROBUST PHASE LOCKING

BACKGROUND OF THE INVENTION

1. Field of Invention

This invention relates to lasers. Specifically, the present invention relates to multiple core laser systems and related phase-locking techniques.

2. Description of the Related Art

Lasers are employed in various demanding applications including fiber optic telecommunications, laser surgery, bar code scanning, compact disk readers, and military targeting and tracking. Such applications often demand compact, high-power, eye-safe lasers.

Small, high-power, eye-safe lasers are particularly important in military airborne applications, including airborne ladar, range finding, target identification, and missile guidance, which often involve large standoff distances. Missile and aircraft space constraints necessitate particularly compact lasers. Unfortunately, conventional eye-safe lasers are often too bulky and under powered for many military applications.

Eye-safe laser systems typically either emit directly at eye-safe wavelengths or generate beams that are frequency-converted to eye-safe wavelengths between 1.4 and 1.8 microns. Lasers that emit directly at eye-safe wavelengths often employ glass hosts, which severely limit thermal handling, power scalability, and overall laser system applicability.

To enhance power output, Nd-doped YAG crystal ($Y_3Al_5O_{12}$) lasers are often employed. Nd:YAG lasers typically employ frequency conversions, such as Raman and optical parametric oscillators (OPO's) to convert an intermediate beam into an eye-safe beam operating between 1.4 and 1.8 micron wavelengths. These systems require several relatively large pump sources and bulky conversion optics and are not readily scalable to high average power or high pulse power. Consequently, Nd:YAG lasers employing conventional frequency-conversion systems are impractical for many applications.

Alternatively, combining multiple laser beams via phase locking based on the Talbot effect may increase power scalability. However, phase-locking systems based on the Talbot effect generally require precise periodical structures of equal lengths to facilitate phase locking. Phase locking of Multiple Core (multicore) Fiber (MCF) lasers via the Talbot effect generally requires individual equal-length fiber cores and is highly dependent on the individual power output in each core. Unequal length fibers may yield prohibitively inefficient lasers. Furthermore, the fibers require precise periodic positioning. Mechanical and thermal manufacturing issues necessitate expensive processing for precise fiber length equalization and periodic fiber positioning, which may yield prohibitively expensive lasers.

Furthermore, the number of elements that can be phase locked via the Talbot effect is generally limited by common cladding multiplexing issues. Consequently, power-scalability is limited. To achieve multi-kilowatt powers, several multicore fiber lasers would be required. However, the Talbot effect is insufficient to effectively phase lock and thereby coherently combine several multicore fiber laser oscillators.

Alternatively, a digital control method is employed to phase lock multicore fiber outputs. The digital control method involves measuring phases of beams output from individual multicore fibers and then providing feedback to the multicore fiber pump sources to align output phases to facilitate beam combining, i.e., phase locking. Unfortunately, such phase-control techniques often require complicated and expensive digital control loops and beam phase measuring equipment.

Hence, a need exists in the art for an eye-safe, high-quality, robust, cost-effective, compact, and light-weight laser that is readily scalable to high average power and high pulse energy. There exists a further need for a unique phase-locking system that can efficiently combine arbitrary numbers of fiber laser oscillator outputs without requiring precise fiber length equalization or stringent periodic positioning.

SUMMARY OF THE INVENTION

The need in the art is addressed by the robust scalable laser system of the present invention. In the illustrative embodiment, the inventive laser system is adapted for use in high power applications requiring eye-safe laser beams. The laser system includes plural fiber laser oscillators. A cavity external to the fiber laser oscillators coherently combines plural laser beams output from the plural fiber laser oscillators into a single output laser beam.

In a more specific embodiment, the plural fiber laser oscillators are eye-safe laser oscillators, such as double-clad Er:YAG laser oscillators. The laser system further includes high-power laser pump sources, such as laser diodes, that are coupled to the fiber laser oscillators. The pump sources are end-coupled via pigtails or discrete imaging optics. Alternatively, the pump sources are side coupled, edge coupled, fusion coupled, and/or coupled via a reflective cavity.

In the specific embodiment, the fiber laser oscillators are either very closely equivalent lengths or substantially differ in length by more than approximately ~1.5 centimeters. The cavity incorporates an external spatial filter that includes beam-flattening optics, a lens pair having a filtering aperture therebetween, and a feedback mirror.

The novel design of the present invention is facilitated by the use of an external cavity to efficiently phase lock plural fiber oscillator outputs. By employing an external cavity to implement a spatial filter, large numbers of individual laser beams may be efficiently combined, thereby enabling systems to be scaled to high average powers and high pulse powers as needed. In addition, by combining individual eye-safe fiber laser beams into a single beam in accordance with techniques of the present invention, a high power laser beam operating in the eye-safe range between 1.4-1.8 microns is readily achievable. Use of Er:YAG crystal fiber laser oscillators that are directly coupled and pumped by high power diode lasers yields extremely compact and high power laser systems. Furthermore, employing robust external cavity techniques that do not rely on precise oscillator cavity lengths and do not require equal individual element output powers to efficiently phase lock, reduces overall system cost and improves implementation feasibility.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
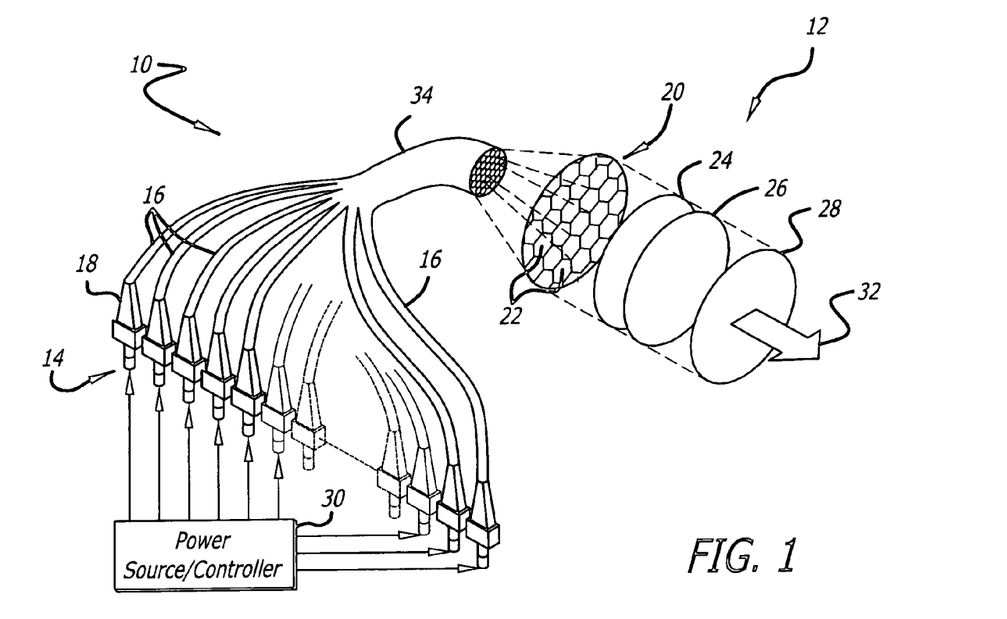
FIG. 1 is a diagram of a high power multicore fiber laser employing a robust coherent phase locker and plural diode array pump sources according to an embodiment of the present invention.

FIG. 1 is a diagram of a high power multicore fiber laser 10 employing a robust coherent phase locker (also called spatial filter or external cavity) 12 and plural diode array pump sources 14 according to an embodiment of the present invention. For clarity, various features, such as mounting systems, doping profiles, and so on, have been omitted from the figures. However, those skilled in the art with access to the present teachings will know which features to implement and how to implement them to meet the needs of a given application.

The laser 10 includes the pump sources 14, which are connected to individual double-clad laser fibers 16 via multimode fiber optic pigtail light pipes 18. The laser fibers 16 include integral back reflectors, as discussed more fully below. In one embodiment, the integral back reflectors are distributed Bragg grating mirrors that are positioned within the fibers 16. The laser fibers 16 are also called laser oscillators, resonators, or elements in the present discussion. Furthermore, for the purposes of the present discussion, the terms phase locker, mode selector, and spatial filter are interchangeable.

The fibers 16 are grouped into a fiber bundle 34 for convenience. The fiber bundle 34 provides output to the spatial filter 12, which is implemented via a combining optical assembly in the present embodiment. The spatial filter 12 includes an array of beam-flattening optics 20, which include hexagonal beam-flattening collimating lens pairs 22 positioned to receive laser energy from each fiber 16. The hexagonal beam-flattening optics 22 are followed by a first collimating lens 24, a second collimating lens 26, and a feedback mirror 28, which are all part of the spatial filter 12. An aperture is positioned between lenses 24 and 26 as discussed more fully below.

In operation, electrical power is selectively applied to the diode array pump sources 14 at a desired repetition rate, waveform, and amplitude via a power controller 30. In the present specific embodiment, each diode array pump source 14 includes several individual Light Emitting Diode (LED) emitters, such as high-power laser diodes.

When power is applied to the diode pump sources 14, individual diode emitters, as discussed more fully below, emit light into the light pipes 18. The light pipes 18 couple the emitted light to the fibers 16. As the emitted light travels through the fibers 16, it bounces off the walls of the fibers 16, which are designed for total internal reflection, and pass through Er:YAG crystal cores. The emitted light, i.e., pump light induces population inversion in the Er:YAG cores within the fibers 16, causing spontaneous emission within the cores at eye-safe frequencies. The spontaneous emission results in laser light that becomes amplified as it propagates along each of the fibers 16. Individual laser beams generated within the fibers 16, which are single-mode fibers, are Gaussian-like Transverse Electromagnetic (TEM$_{00}$) mode beams. Other modes are not present.

The lengths of the fibers 16 are set to provide longitudinal mode overlap between the beams travelling along the fibers 16 to ensure that different fibers can operate at the same wavelength(s), providing maximum beam combining efficiency via the spatial filter 12, which is also called a phase-locker. In one embodiment, the fibers 16 are near equivalent lengths. In another embodiment that is discussed more fully below, the fibers differ in length sufficiently (by more than 1.5 centimeters) to ensure that free spectral range is exceeded so that longitudinal mode overlap occurs between individual fiber output beams via the spatial filter 12.

In a long cavity length oscillator of length L (here L is the optical length, where refractive index is taken into account; the optical length is the product of physical length and the material refractive index (n)), the longitudinal mode spacing ($\Delta\nu = \nu_{q+1} - \nu_q$, where $\nu_q$ is the frequency of a "q" mode) defined by the resonator cavity is:

$$\Delta\nu = \frac{c}{2L}, \quad [1]$$

or in terms of wavelength ($\Delta\lambda = \lambda_{q+1} - \lambda_q$, where $\lambda_q$ is the wavelength of a "q" mode):

$$\Delta\lambda = \frac{\lambda^2}{2L}, \quad [2]$$

where c is the speed of light, and $\lambda$ is the center (peak) laser wavelength. For a 5 meter long resonator, the longitudinal mode spacing (for a 1645 nm laser peak wavelength) is approximately 0.0028 Angstroms.

The linewidth ($\delta\nu$ or $\delta\lambda$ in frequency and wavelength domains, respectively) of a laser active medium gain spectrum determines a number (N) of longitudinal modes that laser is capable to oscillate:

$$N = \frac{\delta\nu}{\Delta\nu} = \frac{\delta\lambda}{\Delta\lambda}. \quad [3]$$

The longer the oscillator cavity length L, the larger number of longitudinal modes can participate in the laser generation process. Linewidth of Er:YAG active medium is about 1 Angstrom; thus, Er:YAG gain medium can support approximately N≈375 modes for exemplary 5 meters long fiber laser resonator.

As the lengths of the fibers 16 vary, so do the mode spacing $\Delta\nu_j$ and the number of longitudinal modes within the gain linewidth $N_j$ ($\Delta\nu_j$ and $N_j$ are the mode spacing and the number of longitudinal modes corresponding to a "j" fiber laser). If the lengths of fibers differ substantially, so that the difference in number of modes ($\Delta N = /N_j - N_k/$) for any two (numerated as "j" and "k") different fibers is greater than two, such that $\Delta N > 2$, then the longitudinal mode distributions corresponding to different fibers will provide such overlap that there will be one or several particular modes closely matched in wavelength(s): $\lambda_{jq} \cong \lambda_{km}$, where $\lambda_{jq}$ is "q" mode of a "j" fiber and $\lambda_{km}$ is "m" mode of a "k" fiber. The condition $\Delta N>2$ leads to the requirement on the difference $\Delta L$ in lengths of any two fibers in the fiber bundle ($\Delta L=|L_j-L_k|$; $L_j$ and $L_k$ are lengths of fiber lasers "j" and "k", respectively):

$$\Delta N = \left|\frac{\delta v}{\Delta v_j} - \frac{\delta v}{\Delta v_k}\right| = \left|\frac{\delta \lambda}{\Delta \lambda_j} - \frac{\delta \lambda}{\Delta \lambda_k}\right| > 2 \text{ leads to } \Delta L > \frac{c}{\delta v} = \frac{\lambda^2}{\delta \lambda}. \quad [4]$$

Large enough difference in lengths of fibers provides the possibility for all fiber lasers in a bundle to operate at the same common wavelength(s) randomly picked up within the gain linewidth. The operation at a common wavelength(s) is forced by a coherent phasing mechanism due to the use of a common resonator with a spatial filter inside. Longer fibers and larger gain linewidth make it easier for such longitudinal mode overlap conditions take place. In the example of Er:YAG fiber lasers with about 1 Angstrom linewidth, the difference in optical lengths should be more than ~1.5 cm. This usually occurs naturally with fibers of several meters long, unless one intentionally makes them precisely equal.

Therefore, either ensuring precisely equal lengths of the Er:YAG fibers (oscillators) 16, or deliberately making these oscillators 16 with varying lengths with length differences exceeding 1.5 centimeters, ensures that all fiber oscillators 16 will be capable of longitudinal mode overlap, and therefore capable of being phase locked via the spatial filter 12.

Depending on gain linewidth, fiber lengths, and length differences, longitudinal mode overlap may give not just one but multiple closely matched wavelengths. In this case, an additional spectral etalon (not shown) can be used to select the operation only at one particular common wavelength. This situation may occur for Er:glass fibers because of its very large gain bandwidth. Unlike glass laser gain media, Er:YAG crystal exhibits a sharp gain profile, which may help to maintain the spectral purity of the overlapped phase-locked output beam 32, and, consequently, no additional etalons may be required to limit the wavelength selection of the individual fiber oscillators 16.

The possibility for all fiber lasers to operate at a common wavelength(s) due to longitudinal mode overlap may not be enough for coherent phasing. Coherent phasing may also require a phase matching mechanism that forces the phases ($\phi_j$) of individual laser beams travelling in different fibers to be matched (or equal with regard to any integer number of $2\pi$ (or $\lambda$ in distance) phase differences) in a common plane after beam combining optical element. Thus, the overall combined beam, output from the hexagonal optics 20, and formed by multiple individual beams, gets near flat phase in the plane prior to entering the spatial filter 12, as discussed more fully below.

Phase difference, $|\Delta\phi_{jk}|=|\phi_j-\phi_k|$, between phases $\phi_j$ and $\phi_k$ corresponding to any two "j" and "k" individual fiber laser beams travelling resonator round trip distances $L_j$ and $L_k$ respectively can be written as $$|\Delta\varphi_{jk}| = \frac{2\pi}{\lambda} 2|L_j - L_k|, \quad [5]$$

where $\lambda$ is a common operating wavelength. Difference in round trip distances, $2|\Delta L_{jk}|=2|L_j-L_k|$, is related mainly to the difference in fiber lengths and usually is very large compare to wavelength $\lambda$. The phase difference, showing explicitly an integer number of full $2\pi$ cycles is:

$$|\Delta\varphi_{jk}| = \frac{2\pi}{\lambda} 2|\Delta L_{jk}| = 2\pi[M_{jk} + f_{jk}], \quad [6]$$

where $M_{jk}$ is a large integer number, and $f_{jk}$ is a number less than one. Phase matching occurs when all $f_{jk}$ are equal to some value, $f_{jk}=f$, common for all fiber lasers in the bundle, regardless how different and how large the integer numbers $M_{jk}$ are. Without loss of generality, one can say that the exact phase matching condition occurs when $f=0$.

Exact coherent phasing occurs when there is a common wavelength/frequency, $\lambda_{jq}=\lambda$ or $v_{jq}=v$, and a phase match, $f_{jk}=0$, for all fiber lasers. There will be always some initial non-equalities in these conditions, which in practice will be self adjusted and accommodated during laser operation. Multiple nonlinear mechanisms and processes in active lasing medium and laser cavity, specifically those that responsible for changing refractive index (n) and length, may help in self-adjusting and facilitating the wavelength and phase matching conditions.

Variations of refractive index ($\delta n$) and optical length ($\delta L$) will result in variations of frequency ($\delta v$) and phase ($\delta\phi$) as follows:

$$\delta\varphi = \left(\frac{2\pi}{\lambda}2L\right)\left(\frac{\delta L}{L} + \frac{\delta n}{n}\right), \delta v = -v\left(\frac{\delta L}{L} + \frac{\delta n}{n}\right) \quad [7]$$

Preferably, phase variation is calculated relative to $2\pi$ cycle and frequency change is calculated relative to longitudinal modes spacing. The universal formula describes this as follows:

$$\frac{\delta\varphi}{2\pi} = -\frac{\delta v}{\Delta v} = \left(\frac{2L}{\lambda}\right)\left(\frac{\delta L}{L} + \frac{\delta n}{n}\right), \quad [8]$$

Even small changes in $\delta n$ and $\delta L$ can be sufficient for coherent phasing for large enough magnitude of $\delta\phi$, $\delta v$ variations: $\delta\phi/2\pi$, $\delta v/\Delta v\sim 1$. In the considered example, $\lambda=1645$ nm and L=5 m, so that $2L/\lambda\sim 6\times 10^6$ and $\delta L/L\sim n/n\sim 10^{-7}$ is sufficient.

Multiple nonlinear mechanisms may contribute to coherent phasing at such small required levels of $\delta n$ and $\delta L$ changes. The change in the electron population among the various energy levels in an active lasing media may lead to a change in refractive index. In addition, slight changes in the heat distribution and successive temperature deviations will also lead to a refractive index and optical length changes. Both mechanisms are related to the slight variations of lasing output power. For instance, taking the exemplary numbers for $[(dL/dT)/L]\sim 5\times 10^{-6}$ and $[(dn/dT)/n]\sim 3\times 10^{-6}$, one can estimate that temperature deviation of about $dT\sim 0.02°$ C. is enough to make $\delta\phi/2\pi$, $\delta v/\Delta v\sim 1$. Thus, this clearly indicates that phase locking, i.e., coherent phasing of the individual oscillators will easily be facilitated in this system.

Phase-locking techniques disclosed herein for combining many individual oscillators can also be applied to Yb:glass fiber lasers/amplifiers, micro-lasers arrays, semiconductor lasers, and so on, without departing from the scope of the present invention.

Let us describe in more detail how the phase locking mechanism works. Laser light travelling along the fibers 16 may have variations in intensities, amplitudes, and phases.

The beam-flattening optics 20 in the spatial filter 12 flatten the intensity profiles of beams emerging from the fibers 16 so that each beam has an approximately uniform cross-sectional intensity profile and a flat phase front.

The adjacent beams emerging from the beam-flattening optics 20 have different phases and amplitude profiles. Consequently, the collimated laser light emerging from the array of beam-flattening optics 20 generally has an overall random phase and amplitude profile.

The random phase and amplitude profile results in higher order transverse modes in a combined beam output from the first collimating lens 24. However, the spatial filter 12 attenuates these higher order modes, as the combined beam oscillates between the feedback mirror 28 and integral back reflectors in the fibers 16. Consequently, only the lowest order transverse mode remains in the beam 32 output from the feedback mirror 28, which is a partially transmissive mirror. The lowest order transverse mode corresponds to the desired output beam of a coherently phased fiber laser array. The exact reflectivity of the feedback mirror 28 is application-specific and may be determined by one skilled in the art to meet the needs of a given application without undue experimentation.

In the present specific embodiment, the diameters of the first collimating lens 24 and the second collimating lens 26 are approximately equal to the diameter of the array of beam-flattening optics 20. Beam-flattening optics are well known in the art, and one skilled in the art with access to the present teachings may construct the array of beam-flattening optics 20 without undue experimentation.

The diode pump sources 14, also called pigtail-coupled emitter arrays, emit light at approximately 1500 nm (1470-1550 nm). The emitted light causes spontaneous emission in the Er:YAG resonator cores of the fibers 16 at approximately 1.650 microns.

Those skilled in the art will appreciate that different types of modulation schemes may be employed to pump the laser 10, without departing from the scope of the present invention. Furthermore, the laser fibers 16 may be pumped via pumping sources other than light-emitting diodes, such as via microlaser arrays or other lasers.

The construction of suitable laser fibers equipped with Er:YAG crystal resonator cores and accompanying cladding are known in the art. The exact doping concentrations of erbium (Er) in the YAG (Yttrium-Aluminum Garnet, $Y_3Al_5O_{12}$) crystal substrate are application-specific and may be determined by one skilled in the art to meet the needs of a given application. Furthermore, systems and methods for integrating back reflectors, such as Bragg grating mirrors in laser fibers are also known in the art.

The laser system 10 is a very compact direct diode-pumped multiplexed system that has significantly improved applicability and integration flexibility. The laser system 10 may be readily integrated in applications requiring high-power, robust, eye-safe laser systems that can withstand significant thermal variations.

No directly diode pumped Er:YAG crystal fiber lasers are known to the inventors. Furthermore, no conventional robust phase-locking techniques that can efficiently combine numerous fiber oscillators via an external cavity technique are known.

Figure 2:
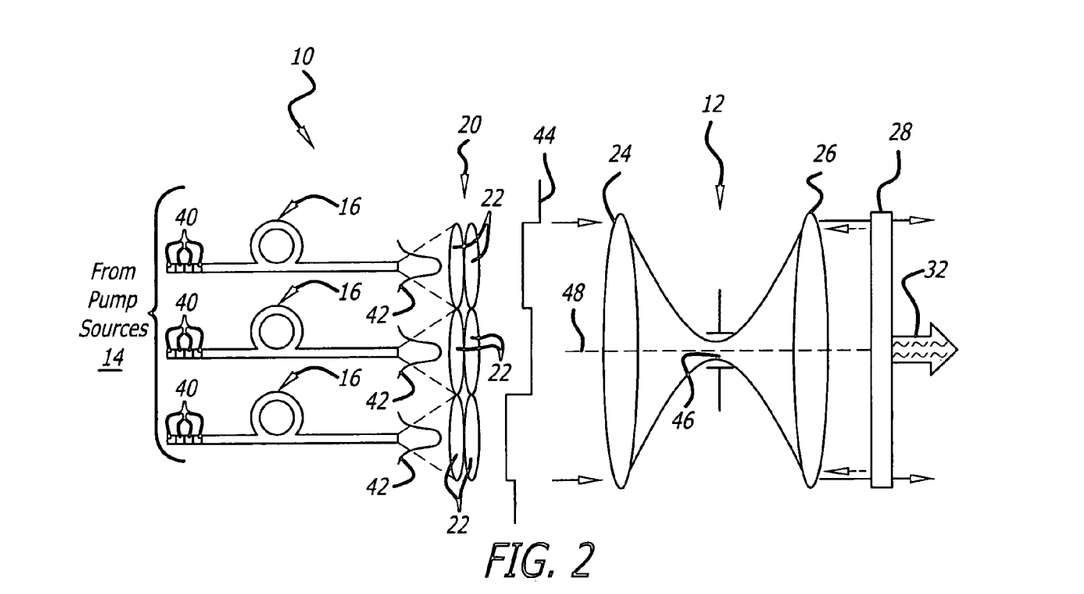
FIG. 2 is a more detailed cross-sectional diagram illustrating the coherent phase locker of FIG. 1.

FIG. 2 is a more detailed cross-sectional diagram illustrating the spatial filter 12 of FIG. 1. In the present specific embodiment, the plural laser fibers 16, which are Er:YAG fibers, are each equipped with integrated Bragg reflectors 40, which act as back reflectors positioned in resonator cavities within the fibers 16. The fibers 16 output individual Gaussian-like $TEM_{00}$ beams 42 toward separate beam-flattening optics 22 that are adjacent to the first collimating lens 24. The beam-flattening optics 22 collimate and flatten individual Gaussian-like $TEM_{00}$ beams into top hat laser beams and form a combined beam, which is symbolized by the random phase and amplitude multiple beam profile 44.

A small aperture 46, with a predetermined diameter, is centered at the focal point of the first collating lens 24, which also coincides with the focal point of the second collimating lens 26. The feedback mirror 28 follows the second collimating lens. The optical components 24, 46, 26, and 28 are approximately centered about an optical axis 48 of the spatial filter 12.

In operation, the integral Distributed Bragg Reflectors (DBR's) 40 act as back mirrors that help establish a laser cavity, wherein laser energy oscillates and amplifies, between the DBR's 40 and the feedback mirror 28. A spatial filtering cavity forms between the DRB's 40 and the feedback mirror 28 and acts to combine the top hat laser beam 44 output from the beam-flattening optics 20 into the combined single mode output beam 32.

The DBR's 40 are volume gratings that provide wavelength selective feedback. The fibers 16 lase on a single or several longitudinal modes. As temperature and input current to the pump sources (see 14 of FIG. 1) are changed, lasing hops between longitudinal modes stay near the peak reflectivity of the DBR's 40. The construction of DBR's are known in the art, and one skilled in the art could readily integrate appropriate DBR's into fiber to implement an embodiment of the present invention without undue experimentation.

The DBR's 40 may be replaced with other types of distributed gratings without departing from the scope of the present invention. Lasers with distributed gratings are often called distributed feedback lasers. Instead of providing abrupt reflection like a metal mirror, a distributed grating reflects a portion of energy at each part of the grating. At the back of the grating, the laser energy has been completely reflected. The reflected light is always in the correct phase regardless of the part of the grating that the light reflects from. The reflection distribution may enhance cavity resonance.

Laser light travelling along the fibers 16 may have variations in intensities, amplitudes, and phases. The beam-flattening optics 20 flatten the intensity profiles of beams emerging from the fibers 16 and collimates them so that each beam has an approximately uniform cross-section intensity profile and a flat phase front. The adjacent beams emerging from the beam-flattening optics 20 have different phases and amplitude profiles. Consequently, the combined laser light emerging from the array of beam-flattening optics 20 generally exhibits the overall random phase and amplitude profile 44.

The resulting light is focused by the first collimating lens 24 into the aperture 46, before passing through the second collimating lens 26. The focal point of the second collimating lens 26 also coincides with the position of the aperture 46. The output of the second collimating lens 26 is a combined beam, having attenuated higher order modes. The higher order modes result from differences in phases in the individual beams output by the beam-flattening optics 22.

A portion of the combined beam, called the return beam, reflects from the feedback mirror 28 back through the collimating lenses 24, 26, where any higher order modes are attenuated further. The return beam passes back through the beam-flattening optics 22, where it multiplexes and couples as individual beams back into the individual fibers 16. The return beam reflects from the integral back reflectors 40 in the fibers 16 and then returns back through the first collimating lens 24 and second collimating lens 26. Hence, higher order modes are attenuated by the spatial filter 12 as the laser energy passes back and forth through the external aperture between the collimating lenses 24, 26, yielding the single-mode combined laser beam 32.

The spatial filter 12, also called a phase-locker, employs a unique external cavity technique. The technique is called an external cavity technique, since a portion of the overall laser cavity exists outside of the individual fibers 16. The portion of the cavity extending from the beam-flattening optics 20 to the feedback mirror 28, wherein laser light oscillates back and forth through the aperture 46, is external to the gain medium, i.e., Er:YAG resonator cores within the fibers 16.

In the present embodiment, the elongated Er:YAG laser fibers 16 are resonantly pumped. The fibers 16 are highly efficient, and the resonator cores are formed from a YAG crystal gain medium having relatively low erbium doping concentrations. Molecular erbium concentrations in the YAG crystal substrate are approximately 0.5% or greater to facilitate high efficiency operation. At relatively low erbium concentrations (<0.5% doping), parasitic losses are insignificant, and achievable optical-optical efficiencies are relatively high.

Er:YAG has excellent energy storage capability, and higher gain than Er:glass and negligible re-absorption. Er:YAG is a quasi four level lasing medium, which yields reduced red shifting. Reduced red shifting may be useful in building a frequency-stabilized laser but is not required for coherent phasing.

The resonantly pumped Er:YAG lasers 16 lase directly within the eye-safe wavelength window between 1.4 and 1.8 microns. Er:YAG lasers are pumped directly into the upper laser excited state and have a small quantum defect, ensuring high efficiencies and low thermal loading.

Use of the Er:YAG laser gain medium yields several advantages. The Er:YAG laser fibers 16 yield high absorption efficiencies. The Er:YAG gain medium employed in the fibers 16 has excellent energy storage capability (even better than in Yb:YAG lasers) but higher gain than Er:glass lasers and negligible re-absorption, since erbium in a YAG host acts as a quasi-four level laser. This drastically reduces red shifting often associated with Er:glass lasers.

Use of the unique external cavity spatial filter 12 and accompanying unique phase-locking technique facilitates scalability to multi-kW power levels without compromising the modular structure exhibited by the laser fibers 16 and pump sources 14. Furthermore, the laser system 10 is direct diode pumped, which yields inherent compactness and integration flexibility.

In the present embodiment, the pump sources 14 are diode laser arrays with kW-level power capability. These diode pump arrays 14 are coupled to the fibers 16 via inner cladding, such as via an end-pumped or side-coupled configuration. The integral back reflectors 14 in each Er:YAG crystal fiber laser resonators 16 allow for the necessary feedback in the coherent combining feedback cavity, i.e., spatial filter 12.

The spatial filter 12 coherently combines and phase locks multiple output beams from the fibers 16 in to the single coherent output beam 32 via an external cavity approach that approach that does not depend on stringent dimensional control of the individual fiber oscillators 16. The portion of the cavity formed between the feedback mirror 28 and the beam-flattening optics 20 is external to the fiber lasers 16. However, laser energy returning from the feedback mirror 28 returns back through the fibers 16 and reflects from the integral Bragg grating mirrors 40, which are also called distributed Brag reflectors, and returns back to the external portion of the cavity. The external portion of the cavity between the beam flattening optics 20 and the feedback mirror 28 is called an external cavity for the purposes of the present discussion.

Selectively positioning the aperture 46 in the transform plane of the external cavity lens pair 24, 26, followed by the feedback mirror 28 (also called an output coupler) ensures that only in-phase field components exhibit significant feedback, since the completely out-of-phase components will be lossy and, therefore, suppressed.

The aperture 46 may be implemented as pinhole for only the fundamental mode feedback or via a fitted (matched) aperture with side lobe generation. Those skilled in the art will know which type of aperture and how to construct it to meet the needs of a given application.

The diffraction of the entire system 10, assuming single phase matched wave front, is based on the effective aperture diameter (D) of the collimating lens pairs 24, 26 assuming that this aperture is about equal to the diameter D of the combined beam 44. The coherent diffraction angle ($\theta_{coherent}$) is then:

$$\theta_{coherent} = \frac{2.44\lambda}{D}, \qquad [9]$$

where $\lambda$ is the beam wavelength. The beam spot size ($d_{coherent}$) at the focal plane is:

$$d_{coherent} = \theta_{coherent} \times F, \qquad [10]$$

where F is the focal length of the common lenses. Hence, for the individual elements, the diffraction angle ($\theta_{element}$) in the non phase-locked (non-phased) case is:

$$\theta_{element} = \frac{2.44\lambda}{d_{element}}, \qquad [11]$$

where $d_{element}$ is the diameter of the beam-flattening lenses 22. Equations (9) and (11) could be equivalent to $$\theta_{element} = \frac{2\lambda}{D}$$

in the case of a true square symmetry.

In a symmetrical 2-D arrangement of M elements, the effective aperture diameter (D) is proportional to the diameter of each element ($D = \sqrt{M} d_{element}$) The effective diffraction angle ($\theta_{non-phased}$) for out-of-phase energy, i.e., for the non phase-locked (non-phased) array is then:

$$\theta_{non-phased} = \sqrt{M}\theta_{coherent}, \qquad [12]$$

and $$d_{non-phased} = \theta\text{non-phased}F, \qquad [13]$$

where $d_{non-phased}$ is the effective spot size for the non-phased array, and F is the effective focal length.

It follows that phase and frequency locking enables only the least lossy condition, which is the phased condition, to dominate, since the out-of-phase components will exhibit a much higher loss and will be suppressed by a factor of M on each pass.

The relative transmission (T) per pass of the non-phased mode is:

$$T \sim (d_{coherent}/d_{non\text{-}phased})^2 = 1/M \quad [14]$$

Clearly, the completely non-phased mode, i.e., out-of-phase mode, will be extremely lossy and will not be sustained. The partially phased locked modes, even with only a small fraction of the oscillators out of phase, will see a reduction in transmission, and consequently, gain, and will be suppressed.

For a laser system including approximately 100 fiber oscillators 16, even one pair of oscillators being out of phase will result in approximately a 2% loss per pass of the lossy mode. This is still a viable operation condition for the implementation of phase-locked operation.

To efficiently fill the two-dimensional space within the external cavity (represented generally by the spatial filter 12), hexagonal lens geometry (as shown in FIG. 1) is employed for the lenses 22. This enhances the fill factor of the two-dimensional Er:YAG fiber oscillator array formed by the fiber oscillators 16.

The beam-flattening optics 20, which act as a collimating lens array, transforms the Gaussian TEM$_{00}$ mode coming out of the single mode fiber oscillators 16 to a flat top with greater than 95% efficiency. This is sufficient to facilitate efficient phase locking of the individual oscillators 16.

To effect coherent phase locking of individual fiber oscillators, the following conditions are satisfied. The oscillators operate with frequencies ($v_j = v$) within the gain bandwidth of the Er:YAG lasing medium or exhibit sufficient mode overlap; and the phases of the individual oscillators match ($\phi_j = \phi$) or exhibit sufficient mode overlap.

To ensure $v_j = v$, a possible solution is to make the individual fiber oscillators 16 of identical length. Although, manufacturing fibers 16 with approximately identical lengths is possible, the cavity comprising the free space length from the fiber ends to the common output feedback mirror 28 is difficult and/or expensive to make equal in length for all of the fiber oscillators 16 due to mechanical and thermal issues. Making the fibers deliberately different lengths with sufficient deviation (>1.5 centimeters) such that frequency mode overlap, also called longitudinal mode overlap, occurs within the gain bandwidth of the laser oscillation is often more advantageous or practical.

The coherent combining approach implemented via the spatial filter 12 involves passive and self-induced phase locking. The spatial filter 12 is relatively insensitive to even large fluctuations in the path length of the individual oscillator elements 16, such as due to mechanical, thermal and acoustic interference. In addition, the spatial filter 12 does not require precise align alignment of the phase-locking cavity due to the robust nature of the spatial filter 12. In addition, the spatial filter 12 is not limited to use with Er:YAG crystal fiber lasers, but applicable to any laser oscillator system including slab laser oscillators.

Unlike conventional phase-locking systems that rely on the Talbot effect, which requires a very precise path length alignment and maintenance and, consequently, has limited applicability, systems and methods disclosed herein are more robust and versatile.

Figure 2A:
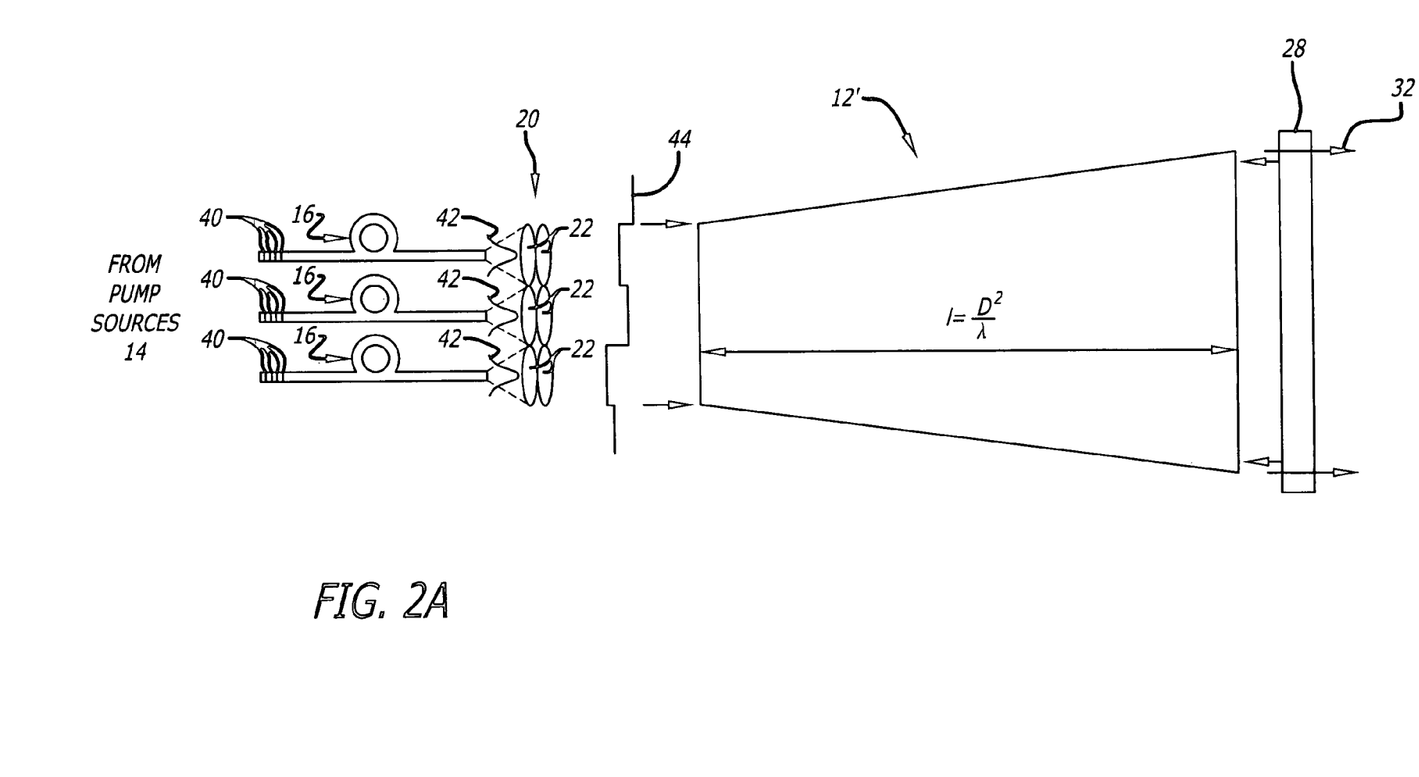
FIG. 2a is a diagram illustrating a first alternative low order phase locker also employing diffraction but with a solid light pipe non-imaging optic.

FIG. 2a is a diagram illustrating a first alternative low order phase locker 12' also employing diffraction but employing a solid light pipe non-imaging optic 50 in place of the lenses 24, 26 and aperture 46 of FIG. 2. The solid light pipe 50 may be omitted, leaving a free space propagation distance (l) between the beam-flattening optics 20 and the feedback mirror 28, without departing from the scope of the present invention.

In the first alternative diffractive low order mode selecting system (phase locker) 12' of FIG. 2a, coherent phasing is achieved by inserting the solid light pipe (non-imaging optic) 50, or alternatively, a free space propagation distance, which has the appropriate length (l) and numerical aperture to facilitate only the lowest order mode feedback. In the present embodiment, the length (l) of the light pipe 50 is approximately a function of laser wavelength ($\lambda$) and the diameter (D) of the combined beam output from the beam-flattening optics 20:

$$l \approx \frac{D^2}{\lambda}. \quad [15]$$

The light pipe 50 may be implemented in glass with low numerical aperture cladding to facilitate attenuating high order modes and to ensure coherent combining.

Figure 2B:
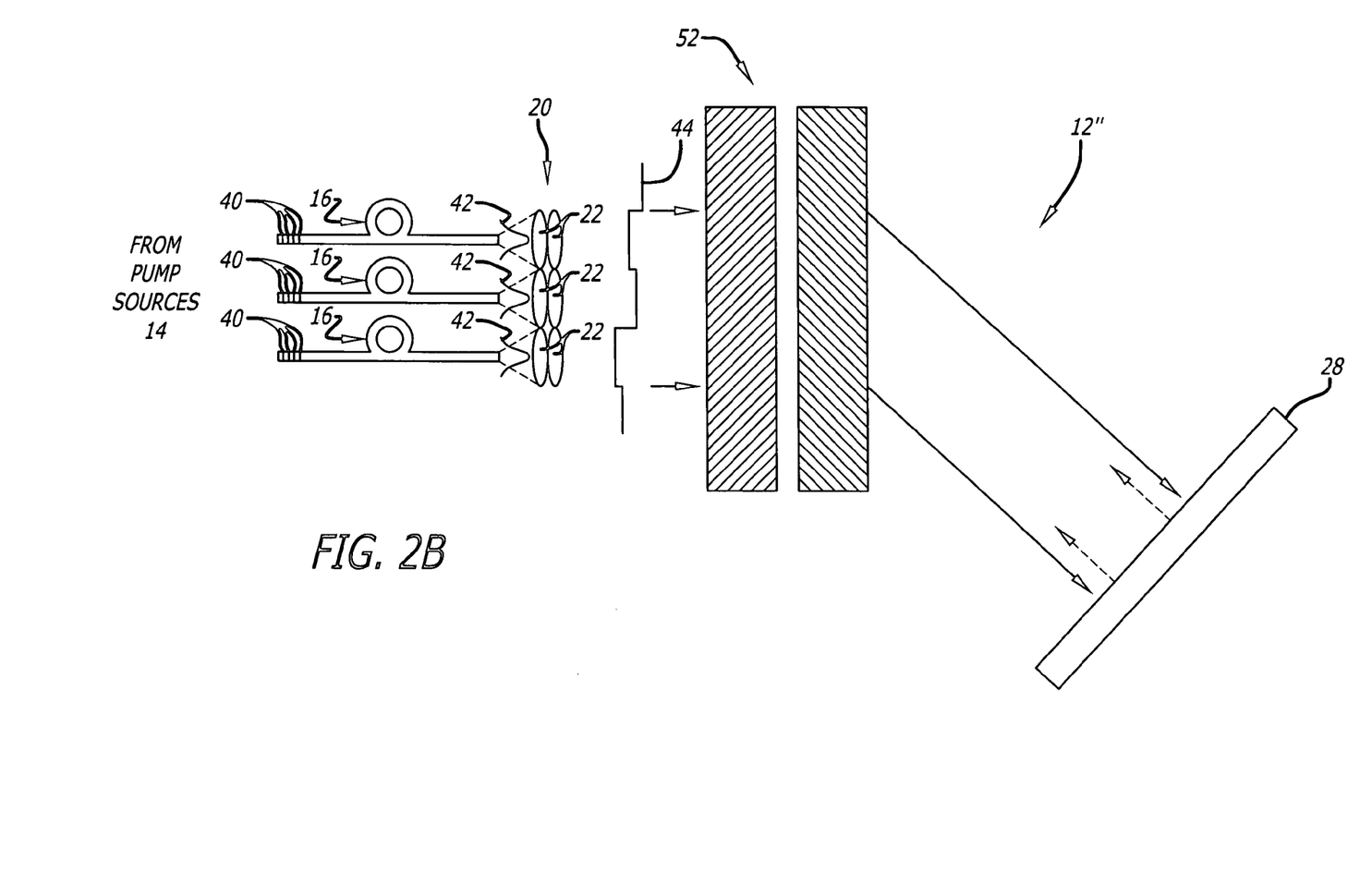
FIG. 2b is a diagram illustrating a second alternative mode selector for achieving low-order mode selection for coherent combining based on volume Bragg diffracting gratings.

FIG. 2b is a diagram illustrating a second alternative mode selector 12" for achieving low-order mode selection for coherent combining based on two adjacent sets of crossed volume Bragg diffracting gratings 52, also called diffractive Bragg gratings or orthogonal distributed Bragg diffractive gratings. The alternative mode selector 12" acts as a diffractive mode feedback selector.

The Bragg gratings 52 ensure that feedback between the strategically oriented feedback mirror 28 and the distributed Bragg reflectors 40 in the laser fibers 16 occurs only at the lowest diffraction modes, thereby facilitating coherent combining. Those skilled in the art with access to the present teachings will know how to position and orient the Bragg gratings 52 and the feedback mirror 28 to meet the needs of a given application, without undue experimentation.

Figure 3:
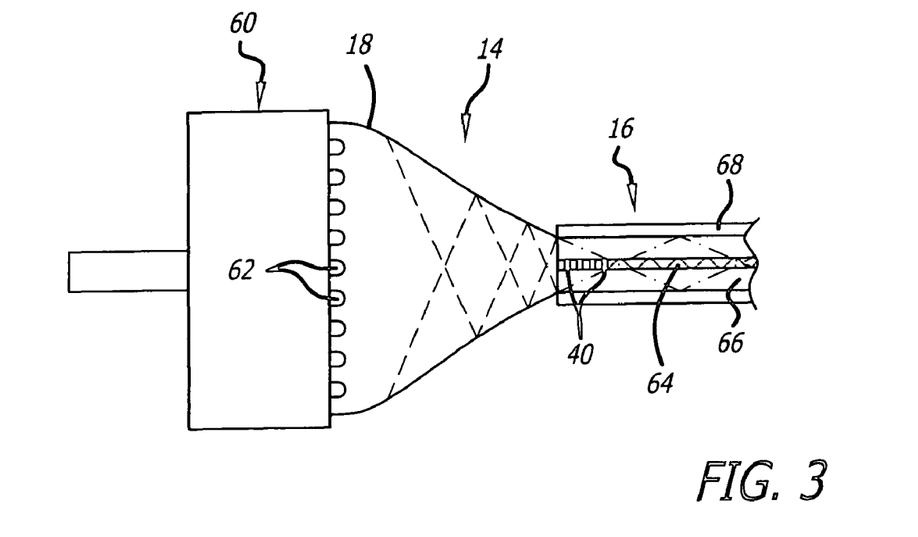
FIG. 3 is a more detailed diagram illustrating a diode array pump source of FIG. 1 employing clad end pumping and a pigtail light pipe.

FIG. 3 is a more detailed diagram illustrating a diode array pump source 14 of FIG. 1. The diode array pump source 14 includes a base 60 having plural Light Emitting Diodes (LED's), such as laser diodes 62. The laser diodes 62 are oriented to aim light into the fiber optic pigtail light pipe 18 that is coupled to the base 60. The pigtail light pipe 18 is wide enough to accommodate the pump source base 60 and tapers to mate with one end of a laser fiber 16. The laser fiber 16 includes an Er:YAG core 64 surrounded by inner dielectric 66. The laser fiber 16 is said to be double clad with inner dielectric 66 and an outer wall dielectric 68. The outer dielectric 68 has a sufficiently high index of refraction to cause total internal reflection of light travelling within the fiber 16. In the present specific embodiment, the outer dielectric 68 is approximately 1 micron thick SiO$_2$.

In operation, the diodes 62 are pulsed at a predetermined frequency or are Continuous Wave (CW) modulated at a predetermined frequency in response to signals from the power source/controller (see 30 of FIG. 1). In the present specific embodiment, the diodes 60 then emit light at approximately 1.532 microns to create electron population inversion and stimulate spontaneous photon emission in the Er:YAG fiber core 64. The emitted light is guided by the pigtail light pipe 18, exhibiting total internal reflection, into the double-clad laser fiber 16. The emitted light then bounces internally along the walls of the fiber laser 16, repeatedly passing through the Er:YAG core 64, and thereby stimulating population inversion and laser emission within the core 64 at approximately 1.650 microns, which is in the eye-safe range between 1.4 and 1.8 microns. The emitted laser light travels approximately parallel to and is confined to the fiber core 64, which may also exhibit internal reflection. Energy from the laser diodes 62 is concentrated in the central portion of the resonator core 64.

Distributed Bragg reflectors 40 are integrated within the core 64 of the fiber 16 to facilitate light amplification within the laser resonator core 64. By facilitating coupling of plural laser diodes 62 into a single fiber laser resonator core 64, high powers are readily achievable. This enhances the scalability of accompanying lasers. Depending on the gain media, intracavity etalons (not shown) may be added to achieve a desired gain profile.

The construction of diode arrays, such as the diode array 62 and the accompanying base 60, is well known in the art. One skilled in the art may employ commercially available diode arrays to implement an embodiment of the present invention without undue experimentation. Note however that coupling plural diode sources into a single fiber is not well known in the art.

Figure 4:
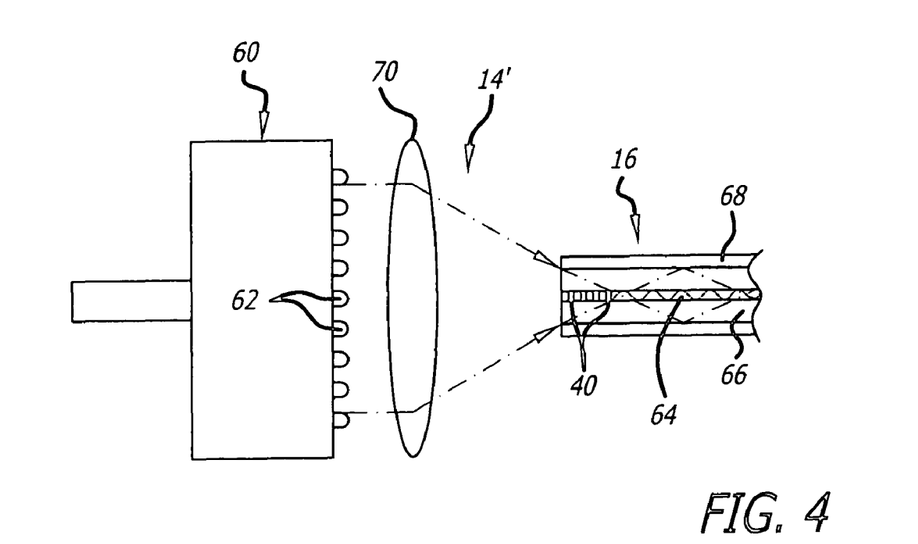
FIG. 4 is a diagram of an alternative diode array pump source employing clad end-pumping and discrete imaging optics.

FIG. 4 is a diagram of an alternative diode array pump source 14' employing clad end-pumping and discrete imaging optics 70. The operation of the pump source 14' of FIG. 4 is similar to the operation of the pump source 14 of FIG. 3 with the exception that the pigtail light pipe 18 of FIG. 3 is replaced with the discrete imaging optics 70, which are positioned between the diode lasers 62 and an open end of the laser fiber 16. The discrete imaging optics 70 focus stimulating light output from the diode lasers 62 in to one end of the laser fiber 16.

Figure 5:
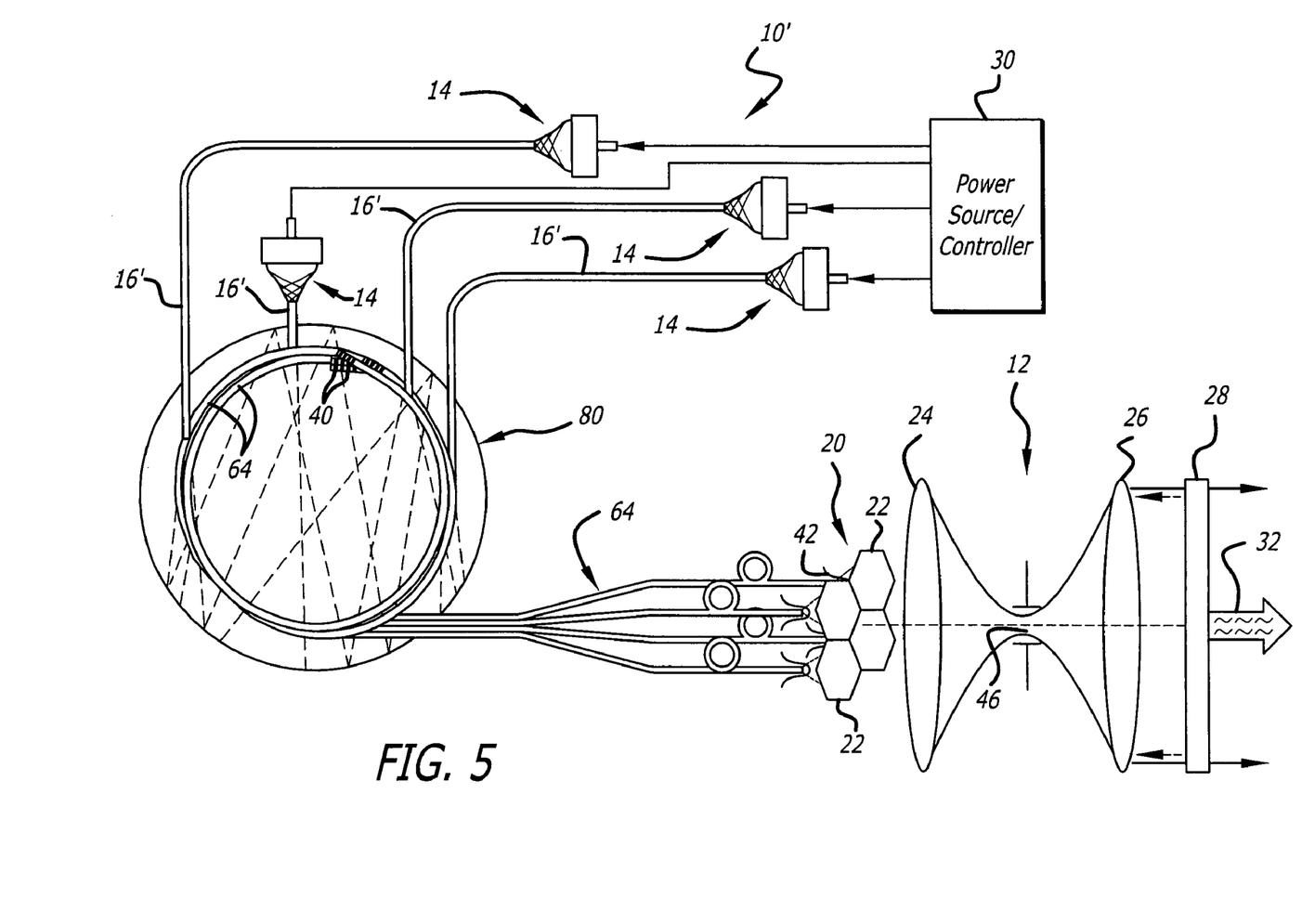
FIG. 5 is a diagram of an alternative embodiment of the multicore fiber laser of FIG. 1.

FIG. 5 is a diagram of an alternative embodiment 10' of the multicore fiber laser 10 of FIG. 1. The operation of the multicore fiber laser 10' of FIG. 5 is similar to the operation of the multicore fiber laser 10 of FIG. 1 with the exception that the laser 10' includes a disk-shaped reflective cavity structure 80 in FIG. 5 to facilitate 100 percent absorption of pump light into the laser cores 64. The laser system 10' employs a compact pumping arrangement, wherein the pump diode array sources 14 are coupled into the reflective disk structure 80 to efficiently capture all the pump light.

Individual double-clad fibers 16' extend from the diode pump sources 14 and feed into the disk-shaped resonator cavity 80. The exposed fiber resonator cores 64 are wound within the reflective cavity structure 80. Stimulating light from the diode pump sources 14 is input to the reflective cavity structure 80 via the fibers 16' and internally reflects within the reflective cavity structure 80, passing through the resonator cores 64, resulting in electron population inversion within the Er:YAG crystal cores 64 and stimulated emission.

In the present embodiment, the double-clad fibers 16' lack resonator cores. Instead, the resonator cores 64 are wound within the reflective disk cavity 80 and have distributed Bragg grating mirrors 40 positioned near back ends of the resonator cores 64. The resonator cores 64 may extend into the double-clad fibers 16' to the pump sources 14 without departing from the scope of the present invention.

In the present alternative embodiment, the crystal resonator cores 64 are equivalent lengths or differ sufficiently, such as by more than 1.5 centimeters, to result in longitudinal mode overlap when coherently combined, i.e., phase-locked by the spatial filter 12.

The disk-shaped resonator cavity 80 may be replaced with another volumetric cavity, such as a spherical cavity, a cylindrical cavity, or rectangular cavity, without departing from the scope of the present invention. Alternatively, side coupling, end-coupling, fusion coupling, prism coupling, or other coupling methods may be employed in addition to or instead of the reflective cavity structure 80 to facilitate coupling of pump light to the Er:YAG resonator cores 64. One skilled in the art may construct an appropriate reflective disk cavity to meet the needs of a given implementation of the present invention without undue experimentation.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A robust scalable eye-safe laser system comprising:
a plurality of laser fibers, said laser fibers including double-clad Er:YAG laser resonators;
a high-power laser pump source coupled to each of said laser fibers; and
an external cavity having an optical axis, and beam-flattening optics characterized by a hexagonal geometry for flattening individual Gaussian-like $TEM_{00}$ beams into top hat laser beams and forming a combined beam symbolized by a random phase and amplitude multiple beam profile, said external cavity having a first lens, a single aperture, a second lens and a mirror located along the optical axis, said single aperture being of predetermined diameter and being located at focal points of the first and the second lenses.

2. The laser system of claim 1 wherein each of said high-power laser pump sources include a laser diode.

3. The laser system of claim 1 wherein said pump sources are end-coupled via pigtails or discrete imaging optics.

4. The laser system of claim 1 wherein said pump sources are side coupled, edge coupled, fusion coupled, and/or coupled via a reflective cavity.

5. The laser system of claim 1 wherein laser fibers with differing lengths differ in length from one another by more than 1.5 centimeters.

6. The laser system of claim 5 wherein said cavity incorporates a diffractive mode feedback selector.

7. The laser system of claim 5 wherein said cavity incorporates a free space propagation distance.

8. The laser system of claim 1 wherein said laser fibers include integrated reflectors.

9. The laser system of claim 8 wherein said integrated reflectors include distributed Bragg reflectors.

10. The laser system of claim 9 wherein said plural pump sources include diodes.

11. The laser system of claim 1 wherein said laser fibers-include cores that are sufficiently different in length to facilitate longitudinal mode overlap among beams traveling along different cores.

12. The laser system of claim 10 wherein said plural pump sources include a diode emitter array for each of said plurality of laser fibers.

13. The laser system of claim 12 further including a clad end-pumping configuration for coupling each diode emitter array to a corresponding laser fiber.

14. The laser system of claim 13 wherein said clad end-pumping configuration includes discrete imaging optics for imaging output beams from each diode emitter array into each laser fiber.

15. The laser system of claim 12 wherein said diode emitter array is adapted to transmit at wavelengths of approximately 1.5 microns.

16. A beam phase-locking system comprising:
first means for receiving plural single-mode beams of electromagnetic energy and providing flat-top beams as output in response thereto; and
second means for combining said flat-top beams via spatial filtering and providing a collimated combined beam in response thereto, said first means including multiple fiber laser oscillators having integrated Bragg grating mirrors, said fiber laser oscillators including Er-doped YAG crystal (Er:YAG) resonator cores, said integrated Bragg grating mirrors representing a first end of a spatial filter included in said second means, and said spatial filter including beam flattening optics characterized a hexagonal geometry, a collimating lens pair having a first collimating lens and a second collimating lens and a single aperture of predetermined diameter therebetween, and a mirror, the aperture being located at the focal points of the first and the second collimating lenses.

17. The system of claim 16 wherein said fiber laser oscillators further include dielectric cladding at least partially surrounding said resonator cores.

18. The system of claim 17 wherein said resonator cores are approximately equivalent lengths.

19. The system of claim 17 wherein different length resonator cores are sufficiently different in length to facilitate longitudinal mode overlap among beams traveling along different resonator cores.

20. The system of claim 19 wherein said resonator cores of different lengths differ in length from one another by more than 1.5 centimeters.

21. The system of claim 16 wherein said Er:YAG resonator cores include YAG crystal doped with less than 0.5% Er molecular concentration.

22. The system of claim 16 further including means for pumping said fiber laser oscillators.

23. The system of claim 22 wherein said means for pumping includes plural diode emitters.

24. The system of claim 23 wherein said means for pumping includes one or more pigtail couplers for coupling one or more diode emitters into each fiber laser oscillator.

25. The system of claim 22 wherein said means for pumping includes discrete imaging optics for coupling one or more diode emitters into each fiber laser oscillator.

26. The system of claim 16 wherein said mirror is positioned adjacent to the second collimating lens and at a second end of said spatial filter, said mirror being partially transmissive.

27. The system of claim 26 wherein said first means includes beam-flattening optics positioned between said Bragg grating mirrors and said first collimating lens.

* * * * *